(12) United States Patent
Koike

(10) Patent No.: US 9,189,059 B2
(45) Date of Patent: Nov. 17, 2015

(54) COMMUNICATION APPARATUS, CONTROL METHOD THEREFOR, AND COMPUTER-READABLE RECORDING MEDIUM

(71) Applicant: CANON KABUSHIKI KAISHA, Tokyo (JP)

(72) Inventor: Koutarou Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 13/749,121

(22) Filed: Jan. 24, 2013

(65) Prior Publication Data

US 2013/0194440 A1    Aug. 1, 2013

(30) Foreign Application Priority Data

Jan. 27, 2012    (JP) .................. 2012-015093

(51) Int. Cl.
| | |
|---|---|
| *G06F 3/00* | (2006.01) |
| *G03B 15/05* | (2006.01) |
| *H04N 5/232* | (2006.01) |
| *H04W 12/06* | (2009.01) |

(52) U.S. Cl.
CPC ................ *G06F 3/005* (2013.01); *G03B 15/05* (2013.01); *H04N 5/23206* (2013.01); *G03B 2206/00* (2013.01); *H04W 12/06* (2013.01)

(58) Field of Classification Search
CPC .................................................. H04N 5/23225

USPC ........................... 348/207.99, 211.99–211.14
See application file for complete search history.

(56) References Cited

U.S. PATENT DOCUMENTS

| | | | |
|---|---|---|---|
| 7,920,169 B2 * | 4/2011 | Jung et al. ................... | 348/211.1 |
| 2003/0020813 A1 * | 1/2003 | Iida ............................. | 348/207.1 |
| 2006/0170958 A1 | 8/2006 | Jung | |
| 2011/0063462 A1 * | 3/2011 | Koike ......................... | 348/211.2 |

FOREIGN PATENT DOCUMENTS

| | | |
|---|---|---|
| CN | 1777133 A | 5/2006 |
| CN | 102264072 A | 11/2011 |
| JP | 2000-228740 A | 8/2000 |

* cited by examiner

*Primary Examiner* — Tuan Ho
(74) *Attorney, Agent, or Firm* — Canon USA, Inc. IP Division

(57) ABSTRACT

A communication apparatus sets one authentication ID for connecting to a network based on user input, changes the set authentication ID to authentication IDs different from each other with respect to each of a plurality of states for communicating with at least any one of an imaging device and a light emission device in a network to execute a predetermined photographing processing, and communicates with at least any one of the imaging device and the light emission device using the changed authentication IDs with respect to each of a plurality of states to execute the predetermined photographing processing.

28 Claims, 11 Drawing Sheets

FIG.6

| AUTHENTICATION ID INPUT VALUE | STATE 1 (ST401) AUTO MODE FLASH CONTROL MODE | STATE 2 (ST402) MANUAL MODE FLASH CONTROL MODE | STATE 3 (ST403) AUTO MODE INTERLOCK RELEASE MODE | STATE 4 (ST404) MANUAL MODE INTERLOCK RELEASE MODE |
|---|---|---|---|---|
| 0000 | 0000 | 10000 | 20000 | 30000 |
| ... | ... | ... | ... | ... |
| 1234 | 1234 | 11234 | 21234 | 31234 |
| ... | ... | ... | ... | ... |
| 9999 | 9999 | 19999 | 29999 | 39999 |

US 9,189,059 B2

COMMUNICATION APPARATUS, CONTROL METHOD THEREFOR, AND COMPUTER-READABLE RECORDING MEDIUM

BACKGROUND OF THE INVENTION

1. Field of the Invention

Aspects of the present invention generally relate to a communication apparatus, a control method therefor, and a program.

2. Description of the Related Art

Conventionally, a technique for issuing an authentication ID to prevent confusion of wireless communications, thereby preventing communications performed with unrelated devices is known (for example, Japanese Patent Application Laid-Open 2000-228740). Further, a technique for issuing a plurality of authentication IDs for each intended use, and utilizing a plurality of networks depending on the intended uses is also known. However, in a case where a plurality of IDs is issued, users need to manage all of these authentication IDs.

SUMMARY OF THE INVENTION

According to an aspect of the present invention, a communication apparatus includes a setting unit configured to, based on user input, set one authentication ID for connecting to a network, a changing unit configured to change the authentication ID set by the setting unit to authentication IDs different from each other with respect to each of a plurality of states for communicating with at least any one of an imaging device and a light emission device in a network to execute a predetermined photographing processing, and a communication unit configured to communicate with at least any one of the imaging device and the light emission device using authentication IDs changed by the changing unit with respect to each of a plurality of states to execute the predetermined photographing processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a diagram illustrating a list of values of authentication IDs in respective states of the flash device.

DESCRIPTION OF THE EMBODIMENTS

Various exemplary embodiments, features, and aspects of the invention will be described in detail below with reference to the drawings.

Hereinbelow, a first exemplary embodiment will be described. The following description refers to a system including an imaging device and an imaging device accessory. For discussion purposes, the imaging device is a camera and the imaging device accessory is a flash device. However, the imaging device can be, for example, a mobile terminal with a camera such as a mobile phone with a camera or a tablet terminal.

Hardware Configuration

Figure 1:
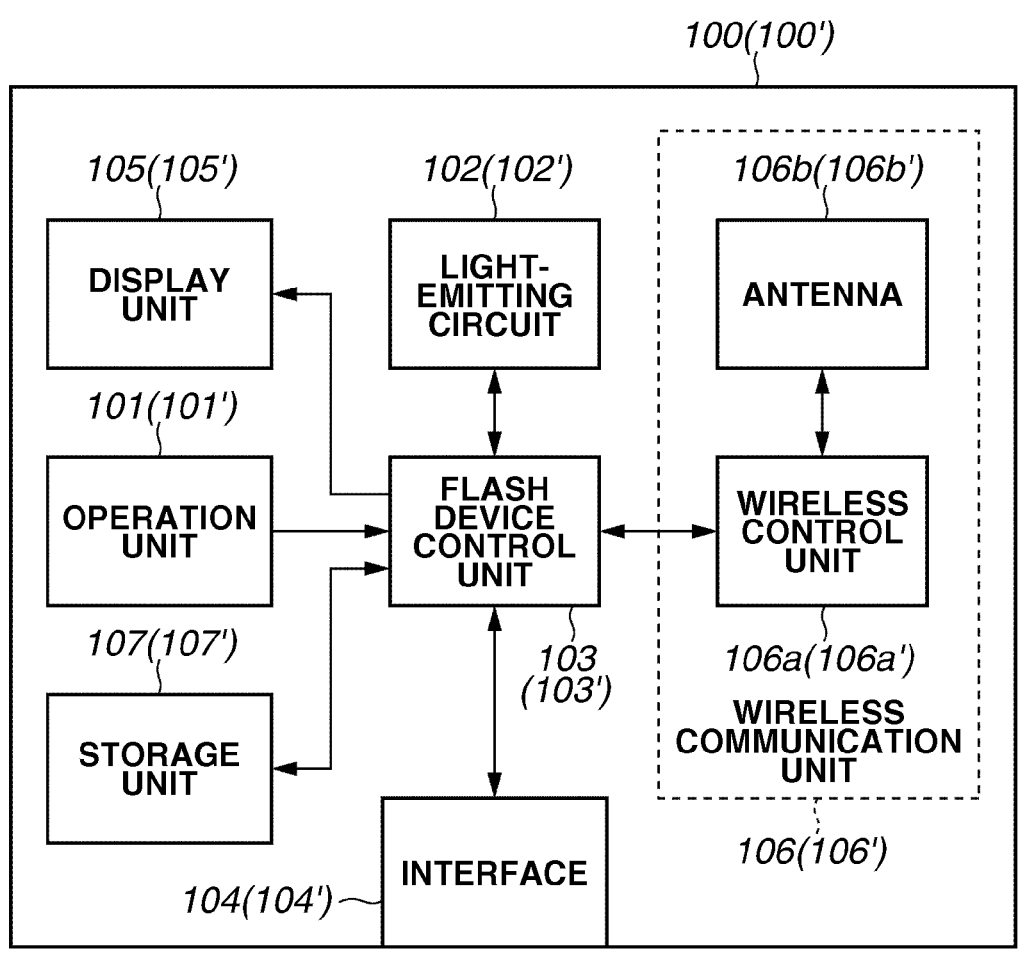
FIG. 1 is a block diagram illustrating an example of hardware configuration of a flash device.

FIG. 1 is a block diagram illustrating an example of hardware configuration of a flash device 100. The flash device 100 includes an operation unit 101, a light emitting circuit 102, a flash device control unit 103 that controls the flash device 100, an interface 104, a display unit 105, a storage unit 107, and a wireless communication unit 106 installed on the flash device 100. The wireless communication unit 106 includes a wireless control unit 106a and an antenna 106b. The flash device 100 can serve as a communication apparatus.

The flash device control unit 103 is physically connected to the operation unit 101, the light emitting circuit 102, the interface 104, the display unit 105, the wireless communication unit 106, and the storage unit 107. The operation unit 101 can be, for example, buttons, switches, dials, etc., and is used by a user to operate the flash device 100. The flash device control unit 103 receives a control signal from the operation unit 101, and controls respective peripheral devices from the light emitting circuit 102 to the storage unit 107 by receiving the control signal.

The flash device control unit 103, upon receiving a flash light emission command, instructs the light emitting circuit 102 to emit a flash of light. Accordingly, light emission processing is performed in the flash device 100. In a case where the flash device control unit 103 communicates a control signal with the imaging device, the communication occurs via the interface 104. A user can change parameter values, such as a light emission amount of the flash device 100, an authentication ID to be used for the wireless communication unit 106 to participate in a network, and a wireless channel via the operation unit 101 or the imaging device connected via the interface 104.

Depending on the parameter values change initiated by the user, the flash device control unit 103 instructs the display unit 105 to display the changed parameter values. Furthermore, the flash device control unit 103 notifies the wireless communication unit 106 of the changed authentication ID or the wireless channel. The wireless communication unit 106 performs wireless communication based on the parameter values received from the flash device control unit 103. The flash device control unit 103 also instructs the storage unit 107 to store the changed parameter values.

According to the present exemplary embodiment, two configurations of the wireless communication unit 106 are provided. One where the wireless communication unit 106 is built into the flash device 100 and the other is where the wireless communication unit 106 is configured as a separate device. In the case of a separate device, the wireless communication unit 106 may, for example, be a removable card that can be attached/detached to/from a card slot provided in the flash device 100. For discussion purposes, the present exemplary embodiment will refer to the configuration where the wireless communication unit 106 is built into the flash device 100. An antenna 106b performs transmission and reception of the wireless communications, and transmits received signals to the wireless control unit 106a. The wireless control unit 106a transmits data received from the antenna 106b to the flash device control unit 103. Conversely, the wireless control unit 106a transmits the data received from the flash device control unit 103 via the antenna 106b.

Figure 2:
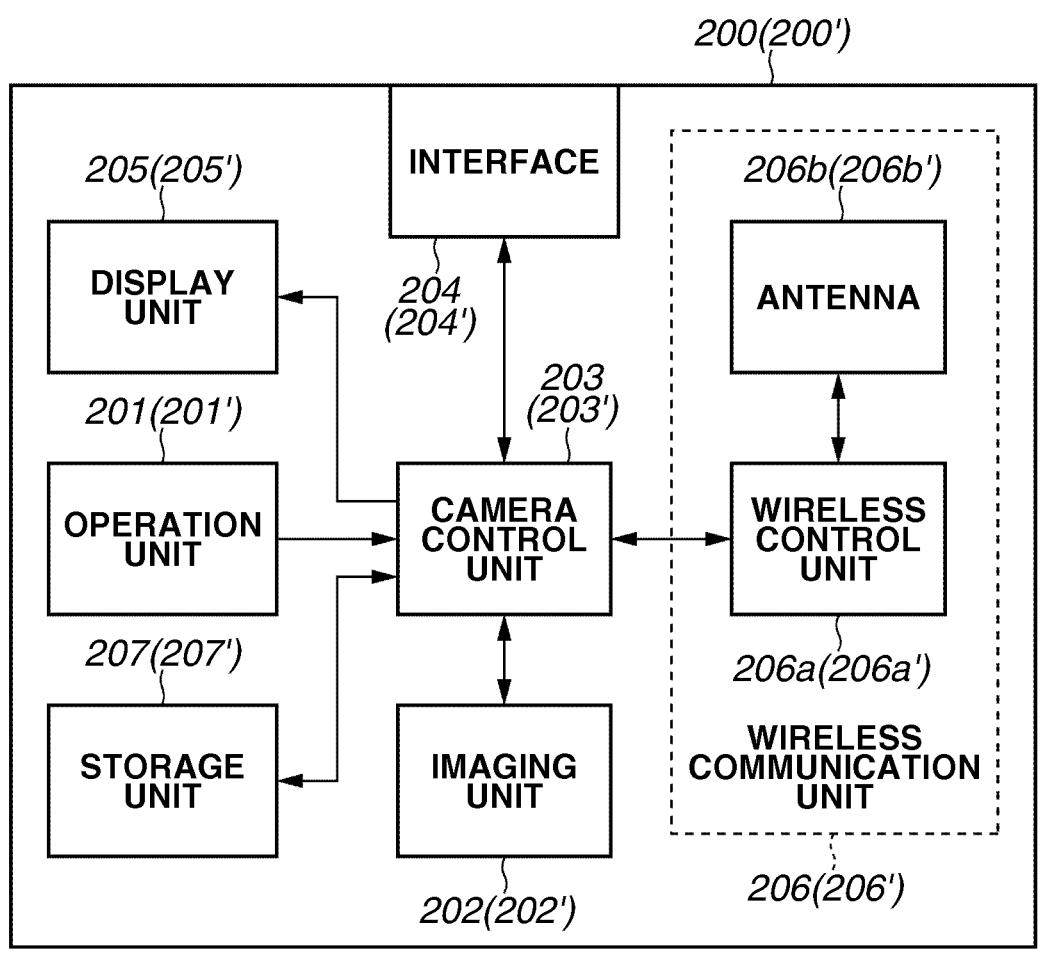
FIG. 2 is a block diagram illustrating an example of hardware configuration of a camera.

FIG. 2 is a block diagram illustrating an example of hardware configuration of a camera 200. The camera 200 includes an operation unit 201, an imaging unit 202 of the camera 200, a camera control unit 203 that controls the camera 200, an interface 204, a display unit 205, a storage unit 207, and a wireless communication unit 206 installed on the camera 200. The wireless communication unit 206 includes a wireless control unit 206a and an antenna 206b. The camera 200 can serve as a communication apparatus.

The camera control unit 203 is physically connected to the operation unit 201, the imaging unit 202, the interface 204, the display unit 205, the wireless communication unit 206, and the storage unit 207. The operation unit 201 can be, for example, buttons, switches, dials, etc., and is used by a user to operate the camera 200. The camera control unit 203 receives a control signal from the operation unit 201, and upon receiving the control signal, controls respective peripheral devices from the imaging unit 202 to the storage unit 207. For example, the camera control unit 203, upon receiving an imaging command, instructs the imaging unit to perform an imaging operation. Accordingly, in the camera 200, imaging processing is performed.

When the camera control unit 203 communicates control signals with the flash device 100, the communication is performed via the interface 204. A user can change parameter values, such as an imaging mode of the camera 200, an authentication ID used for the wireless communication unit 206 to participate in a network, and wireless channels via the operation unit 201 or the flash device 100 connected via the interface 204. The imaging modes include a still image photographing mode, a moving image photographing mode, etc. Depending on the parameter values change initiated by the user, the camera control unit 203 instructs the display unit 205 to display the changed parameter values. Furthermore, the camera control unit 203 notifies the wireless communication unit 206 of the changed authentication ID or wireless channel. The wireless communication unit 206 performs wireless communication based on the parameter values received from the camera control unit 203. The camera control unit 203 also instructs the storage unit 207 to store the changed parameter values.

According to the present exemplary embodiment, two configurations of the wireless communication unit 206 are provided. One is where the wireless communication unit 206 is built into the camera 200. The other is where the wireless communication unit 206 is configured as a separate device. In the case of a separate device, the wireless communication unit 206 may, for example, be configured as a removable card that can be attached/detached to/from a card slot provided in the camera 200. For discussion purposes, the present exemplary embodiment will refer to the configuration where the wireless communication unit 206 is built into the camera 200. An antenna 206b performs transmission and reception of wireless communications, and transmits received signals to a wireless control unit 206a. The wireless control unit 206a transmits data received from the antenna 206b to the camera control unit 203. Conversely, the wireless control unit 206a transmits the data received from the camera control unit 203 via the antenna 206b.

System Configuration

Figure 3:
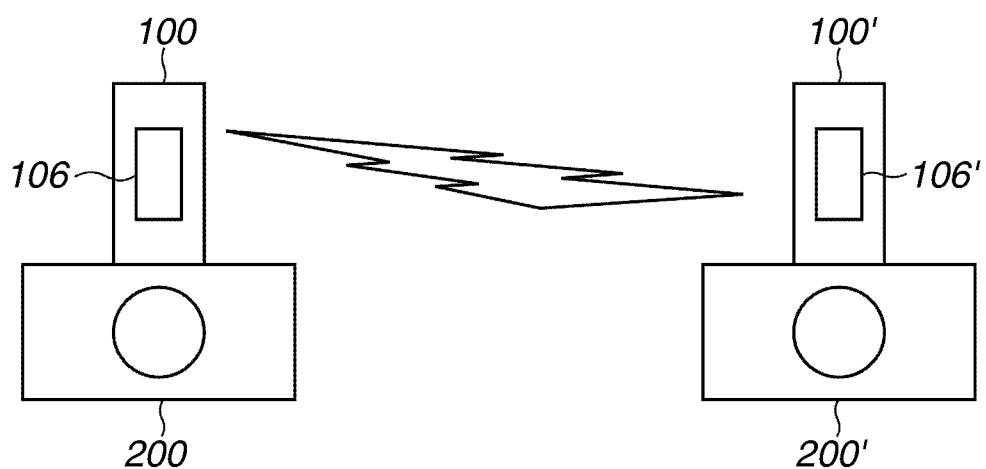
FIG. 3 is a schematic diagram illustrating an example of a system according to a first exemplary embodiment.

FIG. 3 is a schematic diagram illustrating an example of a system in which two flash devices (100, 100') are used. In the system illustrated in FIG. 3, the flash device 100 is wirelessly connected to the flash device 100' via wireless communication units 106 and 106'. In this example, the flash device 100 serves as a master flash device, and the flash device 100' serves as a slave flash device. The master flash device is a flash device on a control side that transmits a control signal such as a light emission command to the slave flash device. On the other hand, the slave flash device is a flash device on a controlled side that receives a control signal from the master flash device to execute processing. Whether to operate as the master flash device or to operate as the slave flash device can be set, for example, by the user via a menu operation. The camera 200 and the master flash device 100 are connected by the interfaces 204 and 104. Further, the master flash device 100 and the camera 200 communication via the interfaces 104 and 204.

The hardware configuration of the slave flash device 100' is the same as that of the master flash device 100. For example, similar to the flash device control unit 103 in the master flash device 100, the slave flash device 100' includes a flash device control unit 103'. The camera 200' and the slave flash device 100' are physically connected by the interface 104' and 204', similar to the camera 200 and the master flash device 100. Further, the slave flash device 100' and the camera 200' communicate via the interface 104' and 204'.

Authentication ID

Authentication IDs of the present exemplary embodiment will now be described. The authentication IDs are used for checking whether the flash devices 100 and 100' are flash devices permitted to be connected to each other when they are connected to a network via the wireless communication units 106 and 106'. In the present exemplary embodiment, the authentication IDs are set by a user inputting a 4-digit number from 0000 to 9999 via the operation units 101 and 101'. The flash device control units 103 and 103' store the 4-digit numbers in the storage units 107 and 107' as the authentication IDs, thereby setting the authentication IDs. While the present embodiment describes the authentication IDs as 4-digit numbers, the authentication IDs are not limited to being numbers or a particular number of digits, and may include characters, etc. To establish network connection between the flash devices 100 and 100', the wireless communication units 106 and 106' read authentication IDs from the storage units 107 and 107' via the flash device control units 103 and 103'. The wireless communication units 106 and 106' start connection processing using the read authentication IDs, and when the authentication IDs coincide with each other, the flash device 100 and the flash device 100' are connected to form a network.

The initial values of the stored authentication IDs in the storage units 107 and 107' are 0000 respectively. When the authentication IDs are changed via the operation units 101 and 101' while participating in the network, the flash device control units 103 and 103' store the changed authentication IDs in the storage units 107 and 107'. Then, the wireless communication units 106 and 106' read the authentication IDs from the storage units 107 and 107' via the flash device control units 103 and 103'. Since the authentication IDs have been changed, the flash device 100 and 100' notify that they are disconnecting from the network in which that are participating via the wireless communication units 106 and 106'.

State Transition

Figure 4:
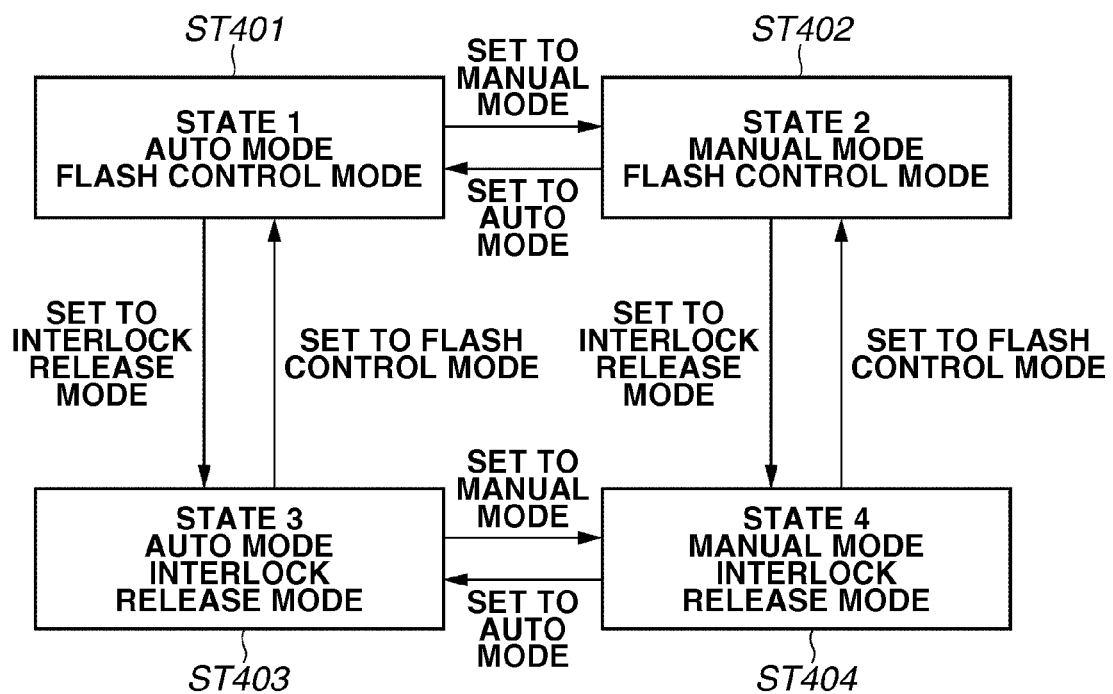
FIG. 4 is a diagram illustrating state transitions of a flash device.

FIG. 4 is a diagram illustrating state transitions of the master flash device 100 and the slave flash device 100'. The master flash device 100 and the slave flash device 100' each allow communication setting and control setting, and the master flash device 100 and the slave flash device 100' can shift to four states by combinations of the modes of respective settings. The "communication settings (wireless channel modes)" have two modes. One is an auto mode for automatically setting a wireless channel used by the wireless communication units 106 and 106'. The other is a manual mode in which the user sets a predetermined wireless channel via the operation units 101 and 101'. Further, "control settings (slave device control modes)" also have two modes. One is a mode for controlling light emission of the slave flash device 100' within the network via the wireless communication units 106 and 106' (hereinafter, a flash control mode). The other is a mode for controlling release of the slave flash device 100' within the network and the camera 200' connected by the interfaces 104' and 204' via the wireless communication units 106 and 106' (hereinafter, a linked release mode).

Next, four states in consideration of the above-described modes will be described. A first state (ST401) is a combination of the auto mode and the flash control mode. A second state (ST402) is a combination of the manual mode and the flash control mode. A third state (ST403) is a combination of the auto mode and the linked release mode. A fourth state (ST404) is a combination of the manual mode and the linked release mode. A transition method to the respective states will now be described. The initial states of the master flash device 100 and the slave flash device 100' are set to a state when power source of the flash device 100 and 100' are turned on. The states when power source of the flash device 100 and 100' are turned on are set to states immediately before power source of the flash device 100 and 100' are turned off, and is stored in the storage units 107 and 107'. In a case where the states are not stored in the storage unit 107 or 107', the flash device control unit 103 or 103' causes the storage unit 107 or 107' to store the initial state.

In this case, the initial state is set to the state 1 (ST401). When the user has set the wireless channel mode from the auto mode to the manual mode by the operation units 101 and 101', the state shifts to the state 2 (ST402). When the user has set the wireless channel mode from the flash control mode to the linked release mode by the operation units 101 and 101', the state shifts to the state 3 (ST403). In the state 2 (ST402), when the user has set the wireless channel mode from the manual mode to the auto mode by the operation units 101 and 101', the state shifts to the state 1 (ST401). When the user has set the wireless channel mode from the flash control mode to the linked release mode by the operation units 101 and 101', the state shifts to the state 4 (ST404). In the state 3 (ST403), when the user has set the wireless channel mode from the auto mode to the manual mode by the operation units 101 and 101', the state shifts to the state 4 (ST404). When the user has set the wireless channel mode from the linked release mode to the flash control mode by the operation units 101 and 101', the state shifts to the state 1 (ST401). In the state 4 (ST404), when the user has set the wireless channel mode from the manual mode to the auto mode by the operation units 101 and 101', the state shifts to the state 3 (ST403). When the user has set the wireless channel mode from the linked release mode to the flash control mode by the operation units 101 and 101', the state shifts to the state 2 (ST402). Transition to each of states from the state 1 (ST401) to the state 4 (ST404) is performed by the flash device control units 103 and 103' being notified via the operation units 101 and 101' by the user.

In this way, in the system in the present exemplary embodiment, four states can be taken according to combinations of the modes. If only one authentication ID has been issued in such a system, there is a possibility that the slave flash device 100' may receive even a control signal in a different mode and operate. Thus, in the present exemplary embodiment, a different authentication ID is supposed to be used in each of four states.

Offset Processing of Authentication ID

Figure 5:
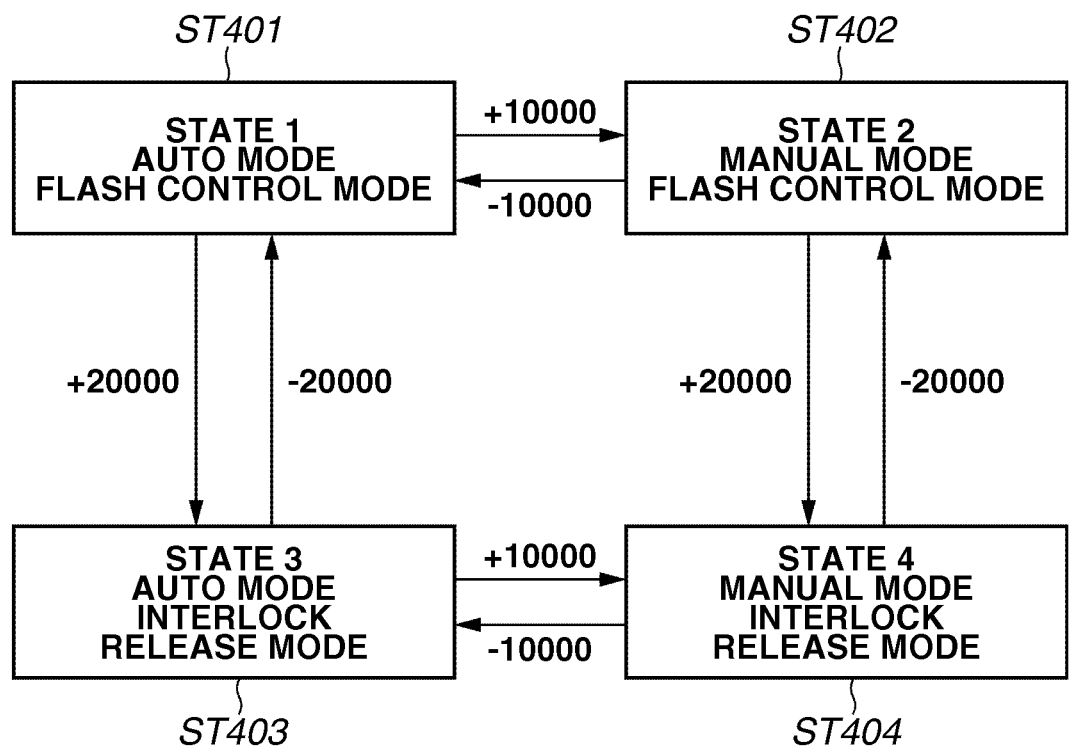
FIG. 5 is a diagram illustrating an outline of offset processing of an authentication ID.

FIG. 5 is a diagram illustrating an outline of offset processing of an authentication ID. As described above, the user can input authentication IDs in 4-digit number from 0000 to 9999 from the operation units 101 and 101'. In the present exemplary embodiment, the user inputs only one authentication ID described above. In the present exemplary embodiment, the wireless control units 106a and 106a' perform offset processing on the one authentication ID, when transitions are made among the states from the state 1 (ST401) to the state 4 (ST404), thereby four authentication IDs can be internally used according to each state. The offset processing in the present exemplary embodiment refers to processing for performing calculations such as adding or subtracting a predetermined value with respect to the standard authentication ID, or for changing an authentication ID by adding or deleting a predetermined character with respect to the standard authentication ID.

Hereinbelow, descriptions will be given specifically. By setting the wireless channel mode from the auto mode to the manual mode by the operation units 101 and 101' by the user, the wireless control units 106a and 106a' change the authentication IDs to values equal to the values thereof plus 10000 (first value) via the flash device control units 103 and 103'. Conversely, when the user sets the wireless channel mode from the manual mode to the auto mode by the operation units 101 and 101', via the flash device control units 103 and 103', the wireless control units 106a and 106a' change the authentication IDs to values equal to the values thereof minus 10000. The flash device control units 103 and 103' store the changed authentication IDs in the storage units 107 and 107'. In this way, by being set to a different wireless channel mode, the wireless control units 106a and 106a' calculate authentication IDs using the first value, and changes to the calculated value.

As the user sets from the flash control mode to the linked release mode by the operation units 101 and 101', the wireless control units 106a and 106a' change the authentication IDs to values equal to the values thereof plus 20000 (second value) via the flash device control units 103 and 103'. Conversely, as the user sets from the linked release mode to the flash control mode by the operation units 101 and 101', the wireless control units 106a and 106a' change the authentication IDs to values equal to the values thereof minus 20000 (second value) via the flash device control units 103 and 103'. The flash device control units 103 and 103' store the changed authentication IDs in the storage units 107 and 107'. In this way, as the wireless channel mode is set to a different control mode, the wireless control units 106a and 106a' calculate authentication IDs using the second value on, and change the authentication IDs to the calculated value.

FIG. 6 is a diagram illustrating a list of values of the authentication IDs from the state 1 (ST401) to the state 4 (ST404). In the state 1 (ST401), an authentication ID takes a value from 0000 to 9999 in which offset is not applied to the authentication ID. When the user sets the wireless channel mode from the auto mode to the manual mode by the operation units 101 and 101', the wireless control units 106a and 106a' set the authentication IDs to values equal to the current values thereof plus 10000 via the flash device control unit 103 and 103'. Conversely, when the user sets the wireless channel mode from the manual mode to the auto mode, the wireless control units 106a and 106a' set the authentication IDs to values equal to the current values thereof minus 10000 via the flash device control units 103 and 103'. Further, when the user sets the wireless channel mode from the flash control mode to the linked release mode by the operation units 101 and 101', the wireless control units 106a and 106a' set the authentication IDs to values equal to the current values thereof plus 20000 via the flash device control units 103 and 103'. Conversely, when the user sets the wireless channel mode from the linked release mode to the flash control mode, the wireless control units 106a and 106a' set the authentication IDs to values equal to the current values thereof minus 20000 via the flash device control units 103 and 103'.

For example, "1234" is input for an authentication ID at the operation unit 101, the authentication ID in the state 1 (ST401) is 1234. The authentication ID in the state 2 (ST402) becomes 11234. The authentication ID in the state 3 (ST403) becomes 21234. The authentication ID in the state 4 (ST404) becomes 31234. By applying offsets in this way in the respective states by the wireless control units 106a and 106a', the authentication IDs in the respective states do not coincide with each other, and thus the flash devices in different states have different authentication IDs, and as a result a network will not be formed. However, the authentication IDs which the display units 105 and 105' display at this time remain "1234", and internal authentication IDs are not shown to the user.

Figure 7:
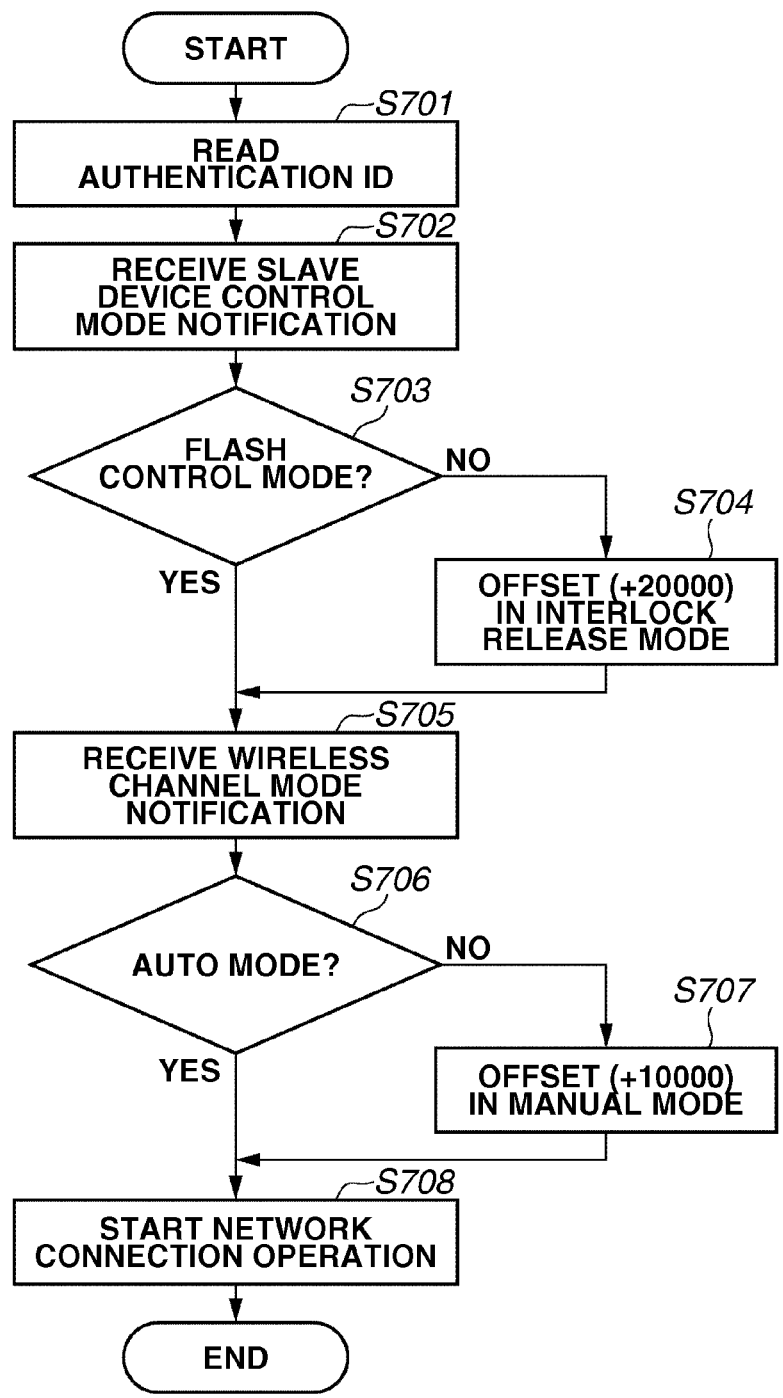
FIG. 7 is a flowchart of offset processing of an authentication ID when a wireless communication unit is activated.

FIG. 7 is a flowchart illustrating offset processing of an authentication ID, when the wireless communication unit 106 and 106' is activated. The processing is realized by the wireless communication units 106 and 106' executing a program stored in the storage units 107 and 107', via the flash device control units 103 and 103'. When the wireless communication units 106 and 106' are activated, in step S701, the wireless communication units 106 and 106' read an authentication IDs stored in the storage units 107 and 107' via the flash device control units 103 and 103'. At this time, initial state is assumed to be the state 1 (ST401) in the auto mode and the flash control mode.

Next, in step S702, the wireless control units 106a and 106a' receive a slave device control mode notification for notifying of the flash control mode or the linked release mode from the flash device control units 103 and 103'. The slave device control mode can be set by the user from the operation units 101 and 101'. In step S703, the wireless control units 106a and 106a' makes confirmation of the received slave device control mode, to determine whether the received mode is the flash control mode. If the received mode is the flash control mode (YES in step S703), the wireless control units 106a and 106a' do not perform offset of the authentication IDs. On the other hand, if the received mode is the linked release mode (NO in step S703), in step S704, the wireless control units 106a and 106a' change the authentication IDs to values equal to the current values thereof plus 20000 via the flash device control units 103 and 103', and stores the changed authentication IDs in the storage units 107 and 107'.

After confirming the slave device control mode, in step S705, the wireless control units 106a and 106a' receive the wireless channel mode notification from the flash device control units 103 and 103'. The wireless channel mode includes the auto mode and the manual mode in which the manual mode designates one channel from for example a channel 1 to a channel 4. The user can set the wireless channel mode from the operation units 101 and 101'. In step S706, the wireless control units 106a and 106a' perform confirmation of the wireless channel mode from the wireless channel mode notifications received from the flash device control units 103 and 103', to determine whether the wireless channel modes are in the auto mode. If the wireless channel modes are in the auto mode (YES in step S706), the wireless control units 106a and 106a' do not perform offset of the authentication IDs. On the other hand, if the wireless channel modes are in the manual mode (NO in step S706), in step S707, the wireless control units 106a and 106a' change the authentication IDs to values equal to the current values thereof plus 10000 via the flash device control units 103 and 103', and store the changed authentication IDs in the storage units 107 and 107'. After the wireless control units 106a and 106a' have confirmed the wireless channel modes, in step S708, the wireless communication units 106 and 106' start network connection operation using the authentication IDs after being subjected to offset.

Figure 8:
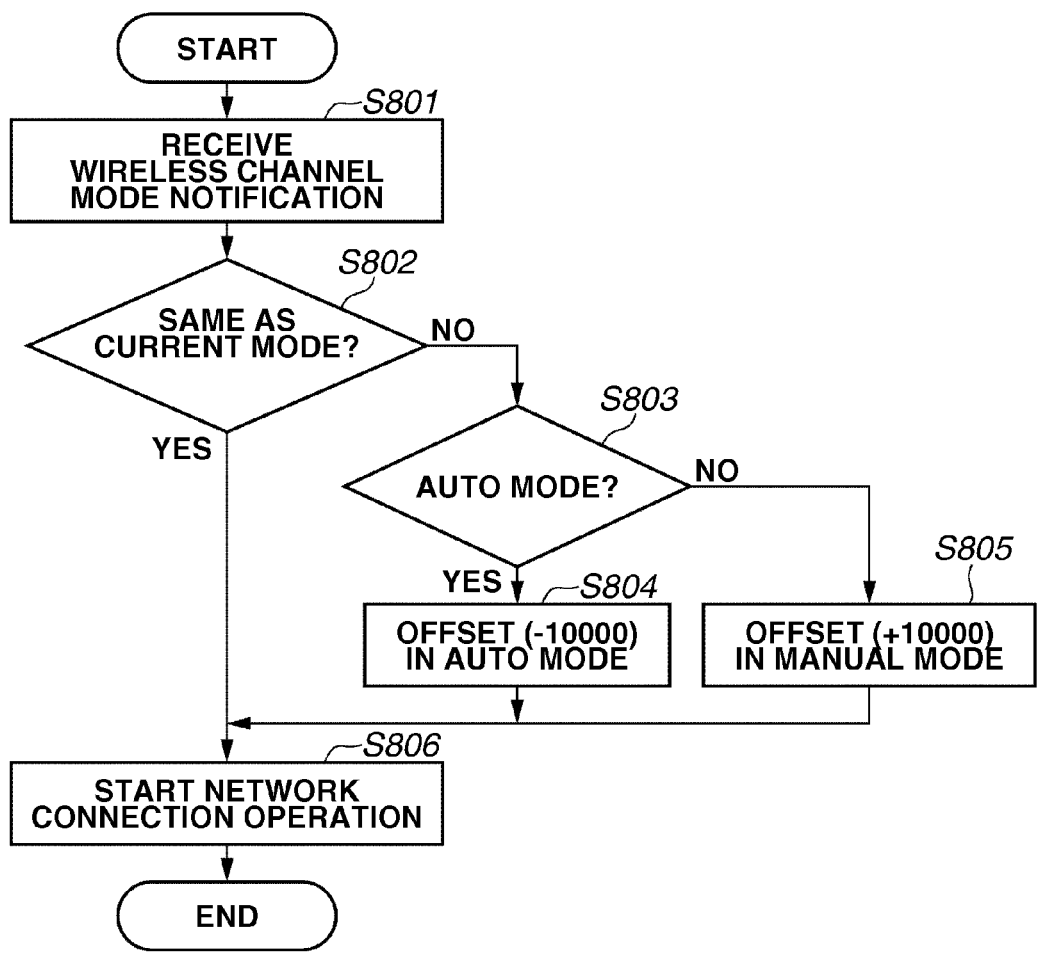
FIG. 8 is a flowchart of offset processing of an authentication ID when a wireless channel mode is changed.

FIG. 8 is a flowchart illustrating offset processing of authentication IDs when the wireless channel modes of the master flash device 100 and the slave flash device 100' are changed. First, in step S801, when the user has changed the wireless channel modes at the operation units 101 and 101', the wireless control units 106a and 106a' receive the wireless channel mode notifications from the flash device control units 103 and 103'. Next, the wireless control units 106a and 106a' read the current wireless channel modes stored in the storage units 107 and 107' via the flash device control units 103 and 103'. In step S802, the wireless control units 106a and 106a' determine whether the read wireless channel modes are the same as the wireless channel modes of the wireless channel mode notifications received from the flash device control units 103 and 103'.

If the wireless channel modes are the same as the current modes (YES in step S802), the wireless control units 106a and 106a' do not perform offset processing of the authentication IDs. If the wireless channel modes are different from the current modes (NO in step S802), in step S803, the wireless control units 106a and 106a' determine whether the wireless channel modes received from the flash device control units 103 and 103' are the auto mode. If the received wireless channel modes are the auto mode (YES in step S803), in step S804, the wireless control units 106a and 106a' change the authentication IDs to values equal to the current values thereof minus 10000 via the flash device control units 103 and 103', and store the changed authentication IDs in the storage units 107 and 107'. If the received wireless channel modes are the manual mode (NO in step S803), in step S805, the wireless control units 106a and 106a' change the authentication IDs to values equal to the current values thereof plus 10000 via the flash device control units 103 and 103', and store the changed authentication IDs in the storage units 107 and 107'. After the wireless control units 106a and 106a' has confirmed the wireless channel mode, in step S 806, the wireless communication units 106 and 106' start network connection operation using the authentication IDs after being subjected to offset.

Figure 9:
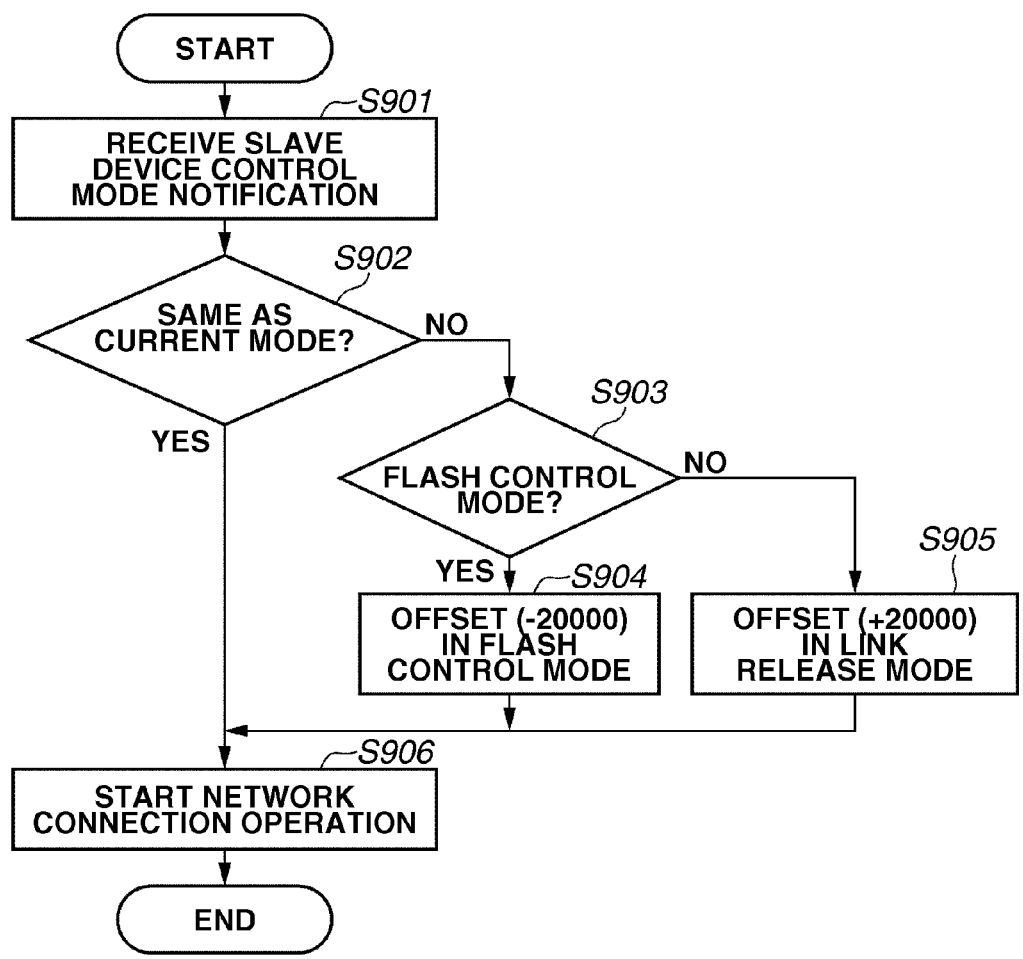
FIG. 9 is a flowchart of offset processing of an authentication ID when a slave device control mode is change.

FIG. 9 is a flowchart illustrating offset processing of authentication IDs when the slave device control mode of the master flash devices 100 and the slave flash device 100' are changed. First, in step S901, when the user changes the slave device control modes at the operation units 101 and 101', the wireless control units 106a and 106a' receive the slave device control mode notifications from the flash device control units 103 and 103'. Next, in step S902, the wireless control units 106a and 106a' read the current slave device control modes stored in the storage units 107 and 107' via the flash device control units 103 and 103'. The wireless control units 106a and 106a' determine whether the read slave device control modes are the same as the slave device control modes of the slave device control mode notifications received from the flash device control unit 103 or 103'.

If the slave device control modes are the same as the current modes (YES in step S902), the wireless control units 106a and 106a' do not perform offset processing of the authentication IDs. If the slave device control modes are different from the current modes (NO in step S902), in step S903, the wireless control units 106a and 106a' determine whether the slave device control modes received from the flash device control units 103 and 103' are the flash control mode. If the slave device control modes are the flash control mode (YES in step S903), in step S904, the wireless control units 106a and 106a' change the authentication IDs to values equal to the current values thereof minus 20000 via the flash device control units 103 and 103', and store the changed authentication IDs in the storage units 107 and 107'. If the slave device control modes are the linked release mode (NO in step S903), in step S905, the wireless control units 106a and 106a' change the authentication IDs to values equal to the current values thereof plus 20000 via the flash device control units 103 and 103', and store the changed authentication ID in the storage units 107 and 107'. After the wireless control units 106a and 106a' have confirmed the slave device control modes, in step S906, the wireless communication units 106 and 106' start network connecting operation using the authentication IDs after being subjected to offset.

In this way, in the present exemplary embodiment, when the wireless communication units 106 and 106' are activated, or when the user changes the wireless channel mode, the slave device control modes at the operation units 101 and 101', the wireless communication units 106 and 106' perform offset processings of the authentication IDs corresponding to the respective states. Therefore, a different network can be formed in each of a plurality of states, using only the authentication IDs which the user has input from the operation units 101 and 101'. In other words, one authentication ID can be separately used according to a plurality of states for executing a predetermined photographing processing, and troublesome management of the authentication IDs by the user can be reduced.

In the present exemplary embodiment, a system using two sets of the flash devices (100,100'), and the cameras (200, 200') has been described, but similarly even in a system using three or more sets, the effects of the present exemplary embodiment can be achieved. Further, in a case where the authentication ID is composed character string instead of numbers, if the wireless control units 106a and 106a', for example, add or delete a character at the head depending on the states of the flash devices 100 and 100', then the effects of the present exemplary embodiment can be achieved. Further, in the present exemplary embodiment, as described in FIG. 7, confirmation of the slave device control mode is performed first, but even when confirmation of the wireless channel mode is performed first, the effects of the present exemplary embodiment can be achieved.

Figure 10:
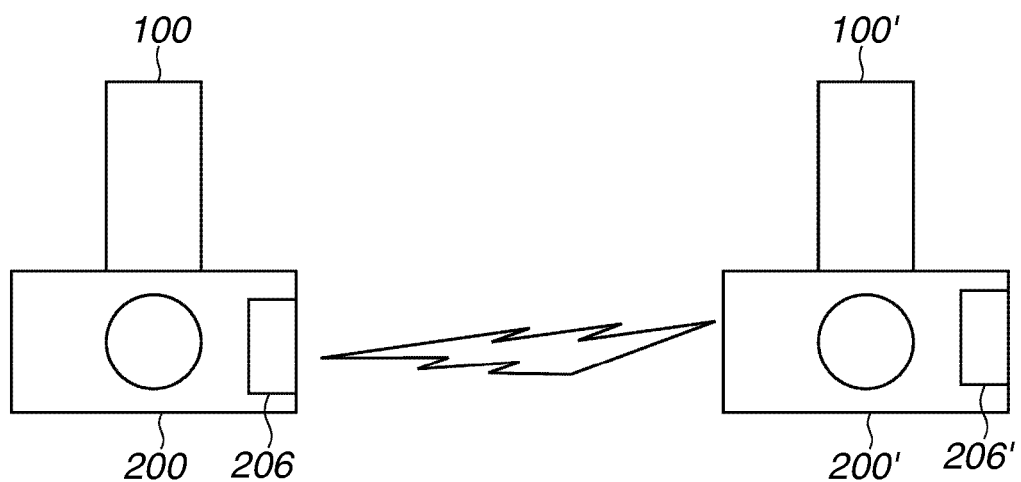
FIG. 10 is a schematic diagram illustrating an example of a system according to a second exemplary embodiment.

Next, the second exemplary embodiment will be described. FIG. 10 is a schematic diagram illustrating an example of a system in a case where the camera 200 is connected to the camera 200' via wireless communication units 206 and 206', as the second exemplary embodiment. In this case, the camera 200 serves as the master camera, and the camera 200' serves as the slave camera.

The master camera 200 is connected to the flash device 100 by the interfaces 104 and 204. Further, the master camera 200 performs communication with the flash device 100 via the interface 204. The slave camera 200' is connected to the flash device 100' by the interfaces 104' and 204'. Further, the slave camera 200' performs communication with the flash device 100' via the interface 204'. The hardware configuration of the slave camera 200' has the same hardware configuration as that of the master camera 200. For example, as the master camera 200 includes the camera control unit 203, the slave camera 200' includes the camera control unit 203'.

An authentication ID required to participate in a network will be described. Similar to the authentication ID in the flash device 100, the user input 4-digit number from 0000 to 9999 from the operation unit 201, and then the camera control unit 203 stores the 4-digit number in the storage unit 207 as the authentication ID, and notifies the wireless communication unit 206. A plurality of devices having coincident authentication IDs forms a network. An initial value of the authentication ID stored in the storage unit 207 is 0000. When the authentication ID is changed by the operation unit 201 while participating in the network, it will lead to withdrawal from the participating network. In this case, the authentication ID has been described as 4-digit numbers, but an authentication ID is not limited to numbers, or a number of digits, and may include characters or the like.

In the present exemplary embodiment, when the wireless communication units 206 and 206' are activated, or when the user changes the wireless channel mode or the slave device control mode at the operation units 201 and 201', the wireless communication units 206 and 206' perform offset processing of the authentication IDs in the same way as in the first exemplary embodiment.

In this way, according to the present exemplary embodiment, by applying offset of the authentication IDs corresponding to the respective states, the wireless communication units 206 and 206' become able to form a different network in each of a plurality of states, based on only the authentication IDs which the user inputs from the operation units 201 and 201'. In the present exemplary embodiment, a system using two sets of the flash devices (100, 100'), and the cameras (200, 200') has been described, but similarly even in a system using three or more sets, the effects of the present exemplary embodiment can be achieved. Further, in a case where the authentication ID is composed of character string instead of numbers, if the wireless control units 206a and 206a', for example, add or delete a character at the head depending on the states of the cameras 200 and 200', the effects of the present exemplary embodiment can be achieved.

Figure 11:
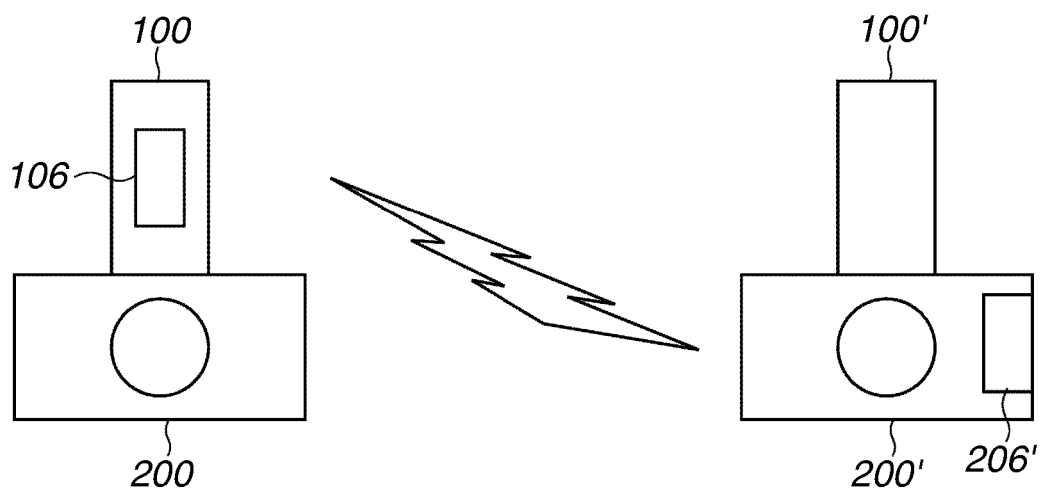
FIG. 11 is a schematic diagram illustrating an example of a system according to a third exemplary embodiment.

Next, a third exemplary embodiment will be described. FIG. 11 is a schematic diagram illustrating an example of a system in a case where the flash device 100 is connected to the camera 200' via the wireless communication units 106 and 206', as the third exemplary embodiment. In this case, the flash device 100 serves as a master flash device, and the camera 200' serves as a slave camera.

The master flash device 100 is connected to the camera 200 by the interfaces 104 and 204. Further, the master flash device 100 performs communication with the camera 200 via the interface 104. The slave camera 200' is connected to the flash device 100' by the interfaces 104' and 204'. Further, the slave camera 200' performs communication with the flash device 100' via the interface 204'. The hardware configuration of the flash device 100' is the same as that of the master flash device 100. Further, the hardware configuration of the camera 200 is the same as that of the slave camera 200'.

In the present exemplary embodiment, when the wireless communication units 106 and 206' are activated, or when the user changes the wireless channel mode or the slave device control mode at the operation units 101 and 201', the wireless communication units 106 and 206' perform offset processing of the authentication IDs in the similar way to the first exemplary embodiment.

In this way, according to the present exemplary embodiment, by applying offsets of the authentication IDs corresponding to the respective states, the wireless communication units 106 and 206' become able to form a networks different from each other in each of a plurality of states, based on only the authentication IDs which the user has input from the operation units 101 and 201'. In the present exemplary embodiment, a system using two sets of the flash devices (100,100'), and the cameras (200,200') has been described, but similarly even in a system using three or more sets, the effects of the present exemplary embodiment can be achieved. Further, in a case where the authentication ID is composed of character string instead of numbers, if the wireless control units 106a and 206a', for example, add or delete a character at the head depending on the states of the flash device 100 and the camera 200', the effects of the present exemplary embodiment can be achieved. Furthermore, even when the camera 200' serves as a master, and the flash device 100 serves as a slave, it is needless to say that similar effects can be obtained.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-015093 filed Jan. 27, 2012, which is hereby incorporated by reference herein in its entirety.

What is claimed is:

1. A communication apparatus comprising:
a setting unit configured to set, based on user input, one authentication identification (ID) for connecting to a network;
a changing unit configured to change the one authentication ID set by the setting unit to output different authentication IDs that are different from each other with respect to each of a plurality of states for communicating with at least any one of an imaging device and a light emission device in a network to execute a predetermined photographing processing; and
a communication unit configured to use a different authentication ID, output by the changing unit with respect to each of a plurality of states, to communicate with at least any one of the imaging device and the light emission device to execute the predetermined photographing processing.

2. The communication apparatus according to claim 1, wherein, to execute the predetermined photographing processing, the changing unit calculates a different authentication ID by performing a calculation on the one authentication ID set by the setting unit with respect to each of a plurality of states, wherein each calculation is different from other calculations.

3. The communication apparatus according to claim 1, wherein the plurality of states is combinations of a wireless channel mode and a control mode between the communication apparatus and another communication apparatus.

4. The communication apparatus according to claim 3, wherein the wireless channel mode includes at least any one of a mode for automatically setting a wireless channel and a mode for specifying a wireless channel by a user.

5. The communication apparatus according to claim 3, wherein the control mode includes at least any one mode of a flash control mode for controlling light emission of the light emission device as the another communication apparatus, and a linked release mode for linking an image capturing between the communication apparatus and the imaging device as the another communication apparatus.

6. The communication apparatus according to claim 3, wherein, when the wireless channel mode has been changed, the changing unit calculates a different authentication ID by performing calculation using a value of the one authentication ID set by the setting unit and a first value.

7. The communication apparatus according to claim 3 wherein, when the control mode has been changed, the changing unit calculates a different authentication ID by performing calculation using a value of the one authentication ID set by the setting unit and a second value.

8. The communication apparatus according to claim 1, further comprising a display unit configured to display a value of the one authentication ID set by the setting unit, wherein, even when the one authentication ID is changed to a different authentication ID by the changing unit, the display unit displays a value of the one authentication ID set, based on user input, by the setting unit.

9. A control method for a communication apparatus, the control method comprising:
setting, based on user input, one authentication identification (ID) for connecting to a network;
changing the set one authentication ID to output different authentication IDs that are different from each other with respect to each of a plurality of states for communicating with at least any one of an imaging device and a light emission device in a network to execute a predetermined photographing processing; and
using a different authentication ID, output with respect to each of a plurality of states, to communicate with at least any one of the imaging device and the light emission device to execute the predetermined photographing processing.

10. A non-transitory computer-readable storage medium storing a program to cause a communication apparatus to perform a control method, the control method comprising:
setting, based on user input, one authentication identification (ID) for connecting to a network;
changing the set one authentication ID to output different authentication IDs that are different from each other with respect to each of a plurality of states for communicating with at least any one of an imaging device and a light emission device in a network to execute a predetermined photographing processing; and using a different authentication ID, output with respect to each of a plurality of states, to communicate with at least any one of the imaging device and the light emission device to execute the predetermined photographing processing.

11. The communication apparatus according to claim 1, wherein the communication apparatus is detachable to the imaging device.

12. The communication apparatus according to claim 1, wherein the communication apparatus is included in light emission device detachable to the imaging device.

13. The communication apparatus according to claim 1, wherein the communication apparatus is built into the imaging device.

14. The communication apparatus according to claim 1, wherein the one authentication ID is a number.

15. The communication apparatus according to claim 14, wherein the changing unit obtains the different authentication IDs by adding or subtracting predetermined value to/from the one authentication ID.

16. The communication apparatus according to claim 1, wherein the one authentication ID is a character string.

17. The communication apparatus according to claim 16, wherein the changing unit obtains the different authentication IDs by adding or deleting predetermined character string to/from the one authentication ID.

18. A communication apparatus comprising:
a setting unit configured to set, based on user input, one authentication identification (ID) for connecting to a network;
a determining unit configured to determine different authentication IDs that are different from each other with respect to each of a plurality of states for communicating with at least any one of an imaging device and a light emission device in a network to execute a predetermined photographing processing, wherein the one authentication ID set by the setting unit is changed to determine at least one of the different authentication IDs; and
a communication unit configured to use at least one of the different authentication IDs determined by the determining unit with respect to each of a plurality of states to communicate with at least any one of the imaging device and the light emission device to execute the predetermined photographing processing.

19. The communication apparatus according to claim 18, wherein the plurality of states is combinations of a wireless channel mode and a control mode between the communication apparatus and another communication apparatus.

20. The communication apparatus according to claim 19, wherein the wireless channel mode includes at least any one of a mode for automatically setting a wireless channel and a mode for specifying a wireless channel by a user.

21. The communication apparatus according to claim 19, wherein the control mode includes at least any one mode of a flash control mode for controlling light emission of the light emission device as the another communication apparatus, and a linked release mode for linking an image capturing between the communication apparatus and the imaging device as the another communication apparatus.

22. The communication apparatus according to claim 18, wherein the communication apparatus is detachable to the imaging device.

23. The communication apparatus according to claim 18, wherein the communication apparatus is included in the light emission device detachable to the imaging device.

24. The communication apparatus according to claim 18, wherein the communication apparatus is built into the imaging device.

25. The communication apparatus according to claim 18, wherein the one authentication ID is a number.

26. The communication apparatus according to claim 25, wherein at least one of the different authentication IDs is output by adding or subtracting predetermined value to/from the one authentication ID.

27. A control method for a communication apparatus, the method comprising:
setting, based on user input, one authentication identification (ID) for connecting to a network;
determining different authentication IDs that are different from each other with respect to each of a plurality of states for communicating with at least any one of an imaging device and a light emission device in a network to execute a predetermined photographing processing, wherein the set one authentication ID is changed to determine at least one of the different authentication IDs; and
using at least one of the different authentication IDs determined with respect to each of a plurality of states to communicate with at least any one of the imaging device and the light emission device to execute the predetermined photographing processing.

28. A non-transitory computer-readable storage medium storing a program to cause a communication apparatus to perform a control method for a communication apparatus, the method comprising:
setting, based on user input, one authentication identification (ID) for connecting to a network;
determining different authentication IDs that are different from each other with respect to each of a plurality of states for communicating with at least any one of an imaging device and a light emission device in a network to execute a predetermined photographing processing, wherein the set one authentication ID is changed to determine at least one of the different authentication IDs; and
using at least one of the different authentication IDs determined with respect to each of a plurality of states to communicate with at least any one of the imaging device and the light emission device to execute the predetermined photographing processing.

* * * * *